United States Patent [19]
Brewer

[11] Patent Number: 5,237,209
[45] Date of Patent: Aug. 17, 1993

[54] BIPOLAR VOLTAGE DOUBLER CIRCUIT

[75] Inventor: Robert J. Brewer, Lambourn, England

[73] Assignee: Analog Devices, Inc., Norwood, Mass.

[21] Appl. No.: 844,509

[22] Filed: Mar. 2, 1992

[51] Int. Cl.$^5$ ............................................. H02M 3/18
[52] U.S. Cl. ...................................... 307/110; 363/60
[58] Field of Search ....................... 307/110, 108, 109; 320/1; 363/59, 60; 378/103; 365/149; 323/208, 218, 233, 293, 352, 364

[56] References Cited

U.S. PATENT DOCUMENTS

| | | | |
|---|---|---|---|
| 4,106,086 | 8/1978 | Holbrook et al. | 363/60 |
| 4,199,806 | 4/1980 | Patterson, III | 363/60 |
| 4,398,099 | 8/1983 | Benoit-Gonin et al. | 363/60 |
| 4,797,899 | 1/1989 | Fuller et al. | 307/110 |
| 5,051,882 | 9/1991 | Grimm et al. | 307/110 |

Primary Examiner—A. D. Pellinen
Assistant Examiner—Richard T. Elms
Attorney, Agent, or Firm—Iandiorio & Dingman

[57] ABSTRACT

A charge pump circuit for providing a bipolar voltage output at substantially double the unipolar voltage input source includes first and second voltage input terminals; a first and a second capacitor; a first switching device for selectively connecting first and second capacitors across the input terminals to charge each to the voltage of the input source; first and second voltage output terminals; a second switching device for selectively connecting the capacitors in series between one of the input terminals and one of the output terminals to generate a first polarity voltage which is substantially double the voltage of the input source; a third switching device for selectively connecting at least one of the capacitors in series between the other of the input terminals and the other of the output terminals to generate a second polarity voltage which is substantially double the voltage of the input source; and a clock for sequentially, selectively actuating the first, second and third switching devices.

9 Claims, 3 Drawing Sheets

BIPOLAR VOLTAGE DOUBLER CIRCUIT

FIELD OF INVENTION

This invention relates to a charge pump circuit for producing a bipolar voltage output at substantially double the unipolar voltage input source, and more particularly to such a charge pump circuit which requires the transfer capacitors to be rated only at the input source voltage.

BACKGROUND OF INVENTION

Voltage doubling and voltage inverting circuits are widely known and are widely used in electronic systems where power consumption is relatively low and a variety of different voltage levels are required for operation. Typically a single unipolar voltage supply of, for example, five volts can be used for generating a range of different bipolar voltages between five and fifteen volts. This is most desirable when these voltage doubling/inverting circuits, also known as charge pumping circuits, can be locally sited on the specific boards and near the specific IC's which rely on them. Presently available charge pumping circuits suffer from a number of shortcomings. In one approach three capacitors are used with a two-phase clock. All three capacitors are charged to the input source in one phase. In the other phase one capacitor is switched in series with the source to provide a positive voltage of twice the input source, and the other two capacitors are connected in series with the positive electrode of one connected to the negative input terminal and the negative terminal of the other capacitor connected to the negative output terminal to provide a substantially doubled, inverted output voltage. This arrangement requires three transfer capacitors which add to the cost and size of the IC chip. There is no time shared use of any of the transfer capacitors. One is used to generate the positive and the other two are used to generate the negative doubled output voltage. In another approach one transfer capacitor is charged by and then added to the source during the two phases of the clock cycle to produce the doubled positive voltage available at a reservoir capacitor. During the same two clock phases the second transfer capacitor first stores the doubled voltage and then is inverted with respect to the negative terminal or ground to produce the doubled, inverted output voltage. This requires that the second transfer capacitor be rated at twice the source voltage or the full doubled output voltage at increased cost. Here again there is no time shared use of the transfer capacitors. One generates the positive, the other the negative, doubled output voltage.

SUMMARY OF INVENTION

It is therefore an object of this invention to provide an improved charge pumping circuit for producing a bipolar voltage output at substantially double the unipolar voltage input source.

It is a further object of this invention to provide such an improved charge pumping circuit in which none of its transfer capacitors need be rated at the doubled output voltage and all may be rated at the input voltage.

It is a further object of this invention to provide such an improved charge pumping circuit in which only two transfer capacitors are required to provide doubled, bipolar outputs.

It is a further object of this invention to provide such an improved charge pumping circuit which is simpler, less expensive, smaller and more reliable.

The invention results from the realization that a truly simple and effective voltage doubling and inverting circuit using only two input voltage rated capacitors can be achieved by charging both capacitors to the input voltage level and then connecting the two in series to obtain the doubled, inverted output and connecting at least one in series with the source to provide the doubled uninverted output.

This invention features a charge pump circuit for providing a bipolar voltage output at substantially double the unipolar voltage input source. There are first and second voltage input terminals and first and second capacitors. First switching means selectively connect the first and second capacitors across the input terminals to charge each of the capacitors to the voltage of the input source. There are first and second voltage output terminals and second switching means for selectively connecting the capacitors in series between one of the input terminals and one of the output terminals to generate a first polarity voltage which is substantially double the voltage of the input source. Third switching means selectively connect at least one of the capacitors in series between the other of the input terminals and the other of the output terminals to generate a second polarity voltage which is substantially double the voltage of the input source. Clock means sequentially selectively actuate the first, second and third switching means.

In a preferred embodiment the first switching means may include means for selectively disconnecting one of the capacitors from the input terminals. The third switching means may also include means for selectively connecting the capacitors in parallel. The clock means may provide a three-phase clock signal having first, second and third phase clock pulses, and the first, second and third switching means may be actuated in sequence by the first, second and third phase clock pulses, respectively. The second switching means may connect the capacitors in series between the negative input terminal and the negative output terminal, while the third switching means may connect the at least one capacitor in series between the positive input terminal and the positive output terminal.

DISCLOSURE OF PREFERRED EMBODIMENT

Other objects, features and advantages will occur to those skilled in the art from the following description of a preferred embodiment and the accompanying drawings, in which.

A charge pump circuit for providing a bipolar voltage output at substantially double the unipolar voltage input source according to this invention may be accomplished using only two transfer capacitors rated at no more than the voltage of the input source. There are first and second input terminals, typically positive and negative terminals with, for example, the negative terminal grounded, and there are two capacitors. First switching means selectively connect each of the capacitors across the positive and negative (grounded) terminals to charge them to the voltage of the input source. There are also positive and negative voltage output terminals at which are presented the positive doubled voltage and the negative doubled voltage. A three-phase clock operates the system so that the first switching means are enabled to charge both of the capacitors during the first phase. During the second phase, second switching means selectively connect those capacitors in series with the positive electrode of one capacitor connected to the negative input terminal, and the negative electrode of the other capacitor connected to the negative output terminal. This provides the doubled inverted or negative output voltage. The third switching means responds to the third phase of the clock signal to selectively connect at least one of the capacitors in series with its negative electrode connected to the positive input terminal and its positive electrode connected to the positive output terminal, to provide the doubled positive output voltage. The third switching means may connect both transfer capacitors in parallel with each other, as well as in series with the input terminals in order to increase the charge available during the positive portion of the cycle. The circuit may conveniently be implemented with NMOS and PMOS FET switches Alternatively, the function of the second switching means can be performed in the third clock phase and that of the third switching means in the second clock phase.

Figure 1:
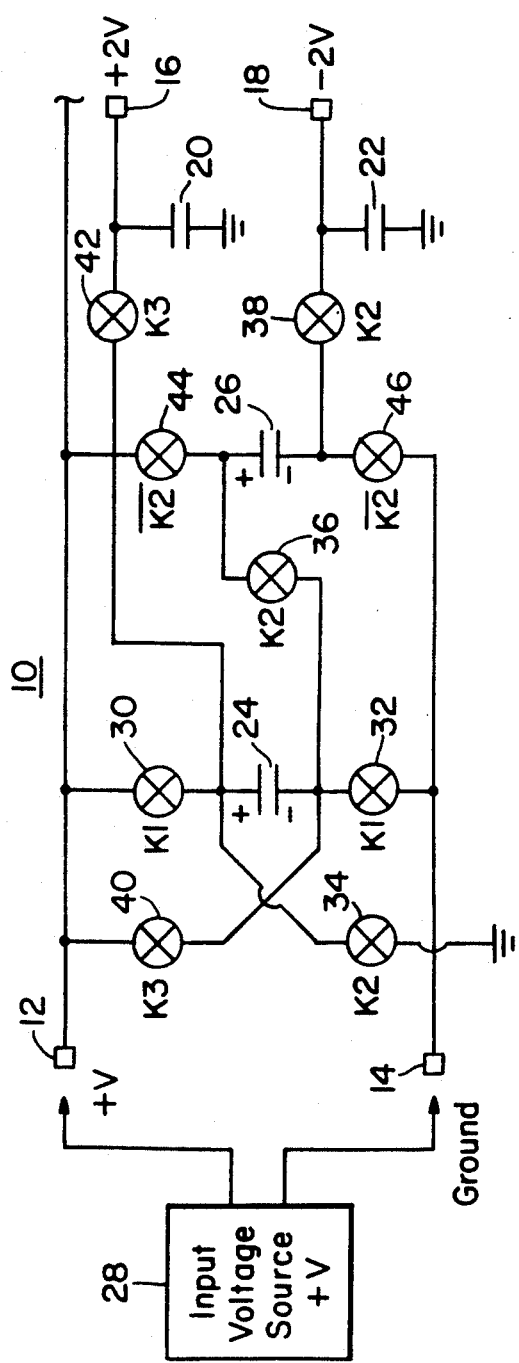
FIG. 1 is a schematic diagram of the charge pump circuit according to this invention.

There is shown in FIG. 1 a charge pump circuit 10 according to this invention having positive 12 and negative 14 input terminals. Negative terminal 14 is grounded. There are also two output terminals, the doubled positive output terminal 16 and the doubled negative or inverted output terminal 18. Conventional reservoir capacitors 20 and 22 are employed at output terminals 16 and 18.

Figure 2:
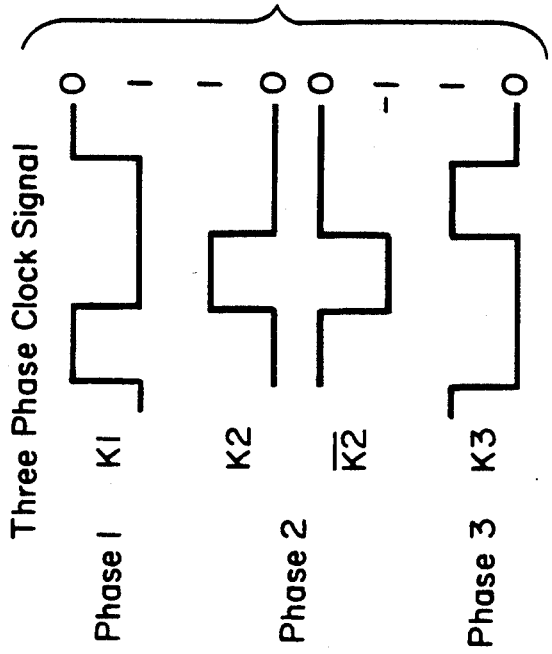
FIG. 2 shows the clock signals which operate the charge pump circuit of FIG. 1.
Figure 3:
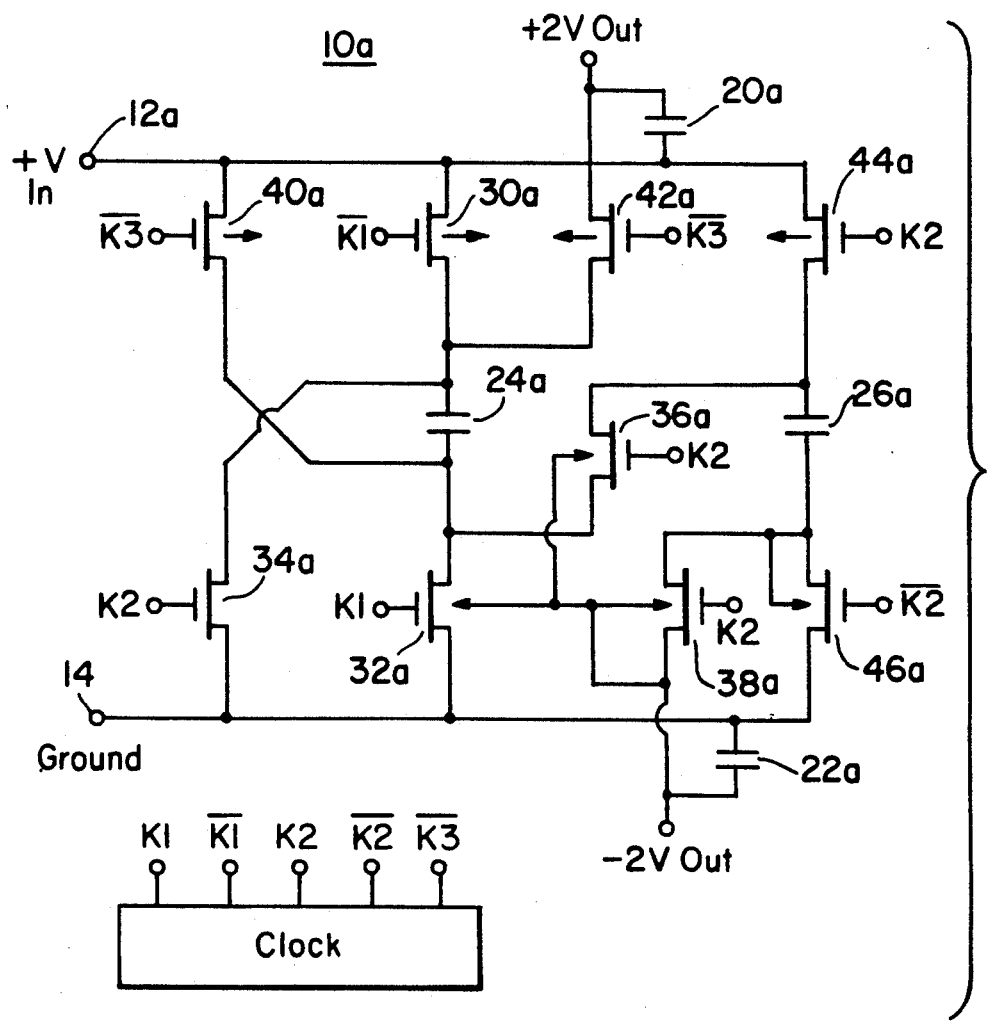
FIG. 3 is a schematic diagram showing a practical implementation of the circuit of FIG. 1 using NMOS and PMOS semiconductor switches.

In accordance with this invention, there are but two transfer capacitors 24 and 26, each of which need only be rated at the level +V available from the voltage provided by the input voltage source 28 to input terminals 12 and 14. Circuit 10 includes K1 switches 30, 32, which are operated during phase 1 of the three-phase clock signal shown in FIG. 2. There are three K2 switches 34, 36, 38 operated during the second phase of the clock signal and two K3 switches 40 and 42 which are operated during the third phase of the clock signal. Two additional $\overline{K2}$ switches 44 and 46 are actuated at all times other than phase 2, namely during phase 1 and phase 3.

In operation, during phase 1 switches 30, 32 and 44, 46 are closed so the transfer capacitors 24 and 26 are connected across input terminals 12 and 14. During phase 2, switches 30, 32, 44 and 46 are disabled and the K2 switches 34, 36 and 38 are closed. This connects the positively charged electrode of capacitor 24 to ground while the negatively charged electrode of capacitor 24 is connected through switch 36 to the positively charged electrode of capacitor 26. The negatively charged electrode of capacitor 26 is in turn connected through switch 38 to output terminal 18. Thus the two capacitors 24 and 26 are connected in series with their positive end connected to ground, so that their negative end with twice the input voltage is presented at output terminal 18. During phase 3, switches 34, 36 and 38 are disabled as are switches 30 and 32. However, switches 44 and 46 are no longer disabled and capacitor 26 is allowed once again to charge. Simultaneously during phase 3, phase 3 switches 40 and 42 are closed so that the negatively charged electrode of capacitor 24 is connected to the positive input terminal 12 and the positively charged electrode of capacitor 24 is connected to the output terminal 16 to provide double the positive input voltage at terminal 16. Alternatively, switches 34, 36 and 38 can be operated during clock phase 3 and switches 44 an 46 can be operated during clock phase 2.

Figure 4:
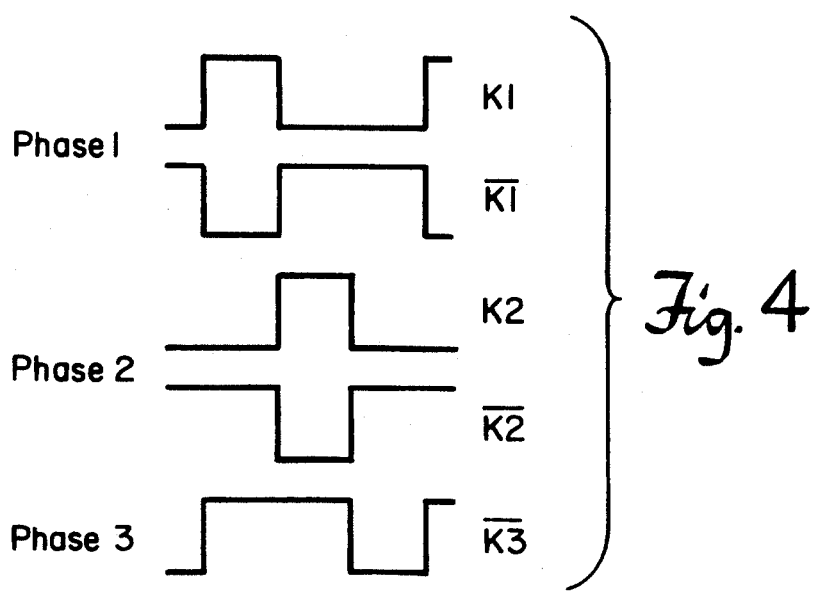
FIG. 4 shows the clock signals used to actuate the semiconductor switches in FIG. 3.

The invention is implemented using NMOS and PMOS FET semiconductor switches in FIG. 4, where like parts have been given like numbers accompanied by a lower case a. The system operates exactly as explained with respect to FIGS. 1 and 2, with the exception that some of the clock signals for phase 1 have been supplemented with the K1 signal and clock signal K3 has been replaced by its complement K3 in order to accommodate the different polarity switching voltages, high for NMOS, low for PMOS, that are required by the semiconductor implementation shown in FIG. 4. FETs 34a, 32a, 36a, 38a and 46a are NMOS FETs, while FET semiconductor switches 40a, 30a, 42a and 44a are PMOS FET semiconductors.

Although thus far only one specific implementation of the circuit has been shown, there are many different variations that can be implemented by changing the switching configuration and/or the clocking signals while still maintaining the use of transfer capacitors which are first charged up to the input voltage and then connected in series to provide the doubled inverted input voltage or connected one or both in series with the input voltage to provide the doubled positive input voltage, as will be understood by one skilled in the art.

Figure 5:
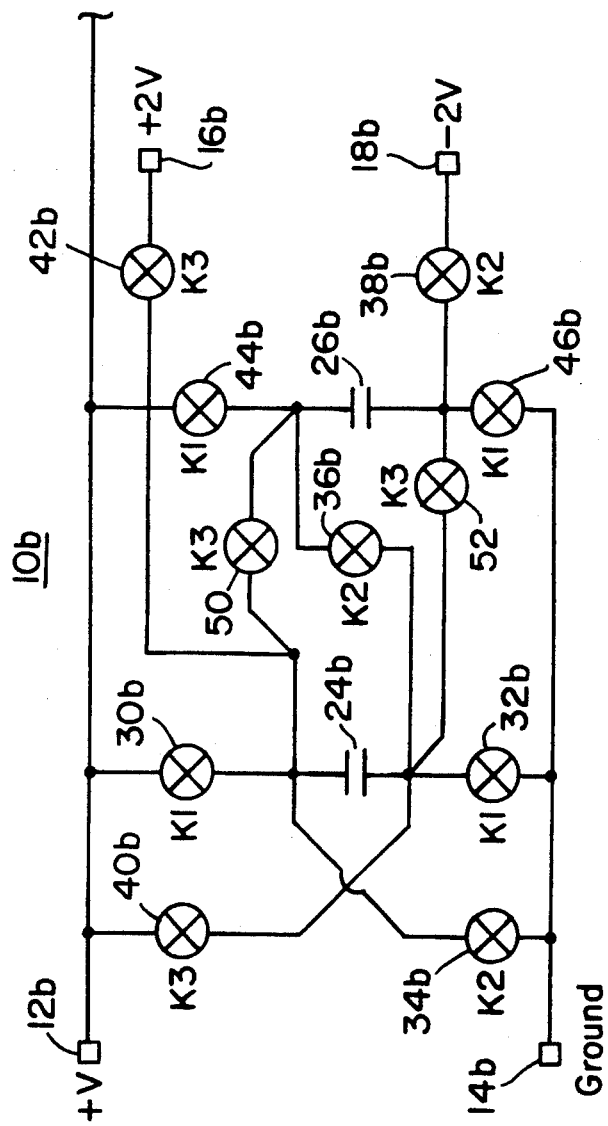
FIG. 5 is a schematic diagram similar to FIG. 1 showing an alternative embodiment in which the two capacitors are connected in parallel during the positive voltage doubling part of the cycle.

In FIG. 5, where like parts have been given like numbers accompanied by a lower case b, charge pump circuit 10b has been reconfigured so that switches 44b and 46b no longer are actuated by the K2 condition but rather by the K1 condition. In addition, two new K3 phase switches 50 and 52 have been added. In this arrangement capacitor 26b is operated in phase K1 along with switches 30b and 32b so that capacitors 24b and 26b are charged simultaneously during the 24b and 26b are connected in series and inverted as previously to provide the doubled inverted (negative) input voltage at output terminal 18b. However, during the third clock phase, capacitor 26b is connected in parallel to capacitor 24b by operation of K3 switches 50 and 52 so that twice the charge is available during the portion of the cycle when the doubled positive voltage is provided at positive output terminal 16b.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A charge pump circuit for providing a bipolar voltage output at substantially double the unipolar voltage input source, comprising:

first and second voltage input terminals;
a first and a second capacitor;

first switching means for selectively connecting said first and second capacitors across said input terminals to charge each to the voltage of the input source;

first and second voltage output terminals;

second switching means for selectively connecting said capacitors in series between one of said input terminals and one of said output terminals to generate a first polarity voltage which is substantially double the voltage of the input source;

third switching means for selectively connecting at least one of said capacitors in series between the other of said input terminals and the other of said output terminals to generate a second polarity voltage which is substantially double the voltage of the input source; and clock means for sequentially, selectively actuating said first, second and third switching means.

2. The charge pump circuit of claim 1 in which said first switching means selectively disconnecting one of said capacitors from said input terminals.

3. The charge pump circuit of claim 1 in which said third switching means includes means for selectively connecting said capacitors in parallel.

4. The charge pump circuit of claim 1 in which said clock means provides a three phase clock signal having a first, second and third phase clock pulse and said first, second and third switching means are actuated in sequence by said first, second and third phase clock pulses, respectively.

5. The charge pump circuit of claim 1 in which said first and second voltage input terminals include a positive and a negative terminal and said first and second voltage output terminals include a positive and a negative terminal.

6. The charge pump circuit of claim 5 in which said second switching means connects said capacitors in series between the negative input terminal and negative output terminal.

7. The charge pump circuit of claim 5 in which said third switching means connects said at least one capacitor in series between the positive input terminal and positive output terminal.

8. A charge pump circuit for providing a bipolar voltage output at substantially double the unipolar voltage input source, comprising:

a positive and a negative input terminal;

a first and a second capacitor;

first switching mean for selectively connecting said first and second capacitors across said input terminals to charge each to the voltage of the input source;

a positive and a negative output terminal;

second switching means for selectively connecting said capacitors in series with the positive electrode of one capacitor connected to said negative input terminal and the negative electrode of the other capacitor connected to said negative output terminal;

third switching means for selectively connecting at least one of said capacitors in series with its negative electrode connected to said positive input terminal and its positive electrode connected to said positive output terminal; and clock means for sequentially, selectively actuating said first, second and third switching means.

9. A charge pump circuit for providing a bipolar voltage output at substantially double the unipolar voltage input source, comprising:

a positive and a negative input terminal;

a first and a second capacitor;

clock means or providing a three phase clock signal;

first switching means, responsive to the first phase of said clock signal, for selectively connecting said first and second capacitors across said input terminals to charge each to the voltage of the input source;

a positive and a negative output terminal;

second switching means, responsive to one of said second and third phases of said clock signal, for selectively connecting said capacitors in series with the positive electrode of one capacitor connected to said negative input terminal and the negative electrode of the other capacitor connected to said negative output terminal; and third switching means, responsive to the other of said second and third phases of said clock signal, for selectively connecting at least one of said capacitors in series with its negative electrode connected to said positive input terminal and its positive electrode connected to said positive output terminal.

* * * * *